United States Patent
Shei et al.

(10) Patent No.: US 7,864,665 B2
(45) Date of Patent: Jan. 4, 2011

(54) METHODS AND SYSTEMS FOR DETECTING IP ROUTE FAILURE AND FOR DYNAMICALLY RE-ROUTING VOIP SESSIONS IN RESPONSE TO FAILURE

(75) Inventors: Yen Shei, Plano, TX (US); Christopher J. Ouellette, McKinney, TX (US); Samuel O. Perry, Garland, TX (US)

(73) Assignee: Tekelec, Morrisville, NC (US)

( * ) Notice: Subject to any disclaimer, the term of this patent is extended or adjusted under 35 U.S.C. 154(b) by 782 days.

(21) Appl. No.: 11/015,296

(22) Filed: Dec. 17, 2004

(65) Prior Publication Data

US 2006/0245350 A1    Nov. 2, 2006

Related U.S. Application Data

(60) Provisional application No. 60/616,651, filed on Oct. 7, 2004.

(51) Int. Cl.
*G01R 31/08* (2006.01)
(52) U.S. Cl. ............... 370/216; 379/273; 379/279; 379/221.01; 379/221.03; 370/352
(58) Field of Classification Search ............... 370/216, 370/217, 221, 389, 392, 352, 356; 379/279, 379/221.01, 221.03, 273
See application file for complete search history.

(56) References Cited

U.S. PATENT DOCUMENTS

| | | | |
|---|---|---|---|
| 6,400,681 B1 * | 6/2002 | Bertin et al. ............... 370/218 |
| 6,763,479 B1 * | 7/2004 | Hebert ............................. 714/4 |
| 7,068,646 B2 * | 6/2006 | Fangman et al. ............ 370/352 |
| 7,424,025 B2 | 9/2008 | Qian et al. |
| 2003/0041146 A1 | 2/2003 | Davis et al. |
| 2005/0007954 A1 | 1/2005 | Sreemanthula et al. |
| 2005/0111382 A1 | 5/2005 | Le et al. |

OTHER PUBLICATIONS

IETF (Internet Engineering Task Force) RFC 826, David C. Plummer, Nov. 1982, pp. 1-8.*
International Search Report and Written Opinion of the International Searching Authority corresponding to PCT application No. PCT/US05/35890 dated Jul. 20, 2006.
Notification of Transmittal of the International Search Report and the Written Opinion of the International Searching Authority, or the Declaration for International Application No. PCT/US05/35892 (Sep. 25, 2007).

* cited by examiner

*Primary Examiner*—Ahmad F Matar
*Assistant Examiner*—Antim Shah
(74) *Attorney, Agent, or Firm*—Jenkins, Wilson, Taylor & Hunt, P.A.

(57) ABSTRACT

Methods and systems for detecting IP route failure using a request-reply protocol, such as address resolution protocol (ARP), and for dynamically re-routing VoIP sessions in a VoIP device in response to failure of an IP route are disclosed. A plurality of IP routes are established between a first VoIP device and a second VoIP device. VoIP sessions are assigned to the IP routes. ARP is used to detect a failure of an IP route. In response to detecting a failure of at least one IP route, VoIP sessions are rerouted from the failed IP route to an alternate IP route.

34 Claims, 4 Drawing Sheets

METHODS AND SYSTEMS FOR DETECTING IP ROUTE FAILURE AND FOR DYNAMICALLY RE-ROUTING VOIP SESSIONS IN RESPONSE TO FAILURE

RELATED APPLICATIONS

This application claims the benefit of U.S. Provisional Application No. 60/616,651 entitled "Media Gateway Features", filed Oct. 7, 2004, the disclosure of which is incorporated herein by reference in its entirety.

TECHNICAL FIELD

The subject matter described herein relates to detecting communication route failures. More particularly, the subject matter described herein relates to methods and systems for detecting IP route failure using address resolution protocol and for dynamically re-routing in response to failure.

BACKGROUND

Modern telephony networks have been transitioning from the traditional Time Division Multiplexing (TDM) network infrastructures to Internet protocol-based (IP) networks over which voice traffic is carried as packets, which is commonly referred to as voice-over-IP (VoIP). Modern telephony networks also separate media switching and call control functionality. Call control, which includes setting up and tearing down calls and maintaining call state machines, is performed by a network entity referred to as a media gateway controller (MGC). Media stream switching, which includes switching media packets between input and output ports and converting the media packets into the appropriate formats for the sending and receiving parties, is performed by a media gateway (MG). Media gateway controllers communicate call control information to media gateways via a media gateway control protocol, such as media gateway control (MEGACO) and media gateway control protocol (MGCP). Typical media gateway control protocols, such as MGCP and MEGACO, include commands for communicating information about each endpoint of a session to the media gateway and instructing the media gateway as to how to process packets to be delivered to each endpoint.

FIG. 1 is a schematic diagram illustrating first and second media gateways 100 and 102 interconnected through an IP network 104. In FIG. 1 media gateways 100 and 102 communicate via IP network 104. In particular, media gateway 100 connects to IP network 104 via segments 106, 108, and 110 and to next-hop routers 112, 114, and 116. Similarly, media gateway 102 is connected to IP network 104 via next-hop routers 118, 120, and 122 and local route segments 124, 126, and 128.

In the network illustrated in FIG. 1, voice-over-IP sessions may be established between media gateway 100 and media gateway 102. The sessions may be associated with IP paths or routes through IP network 104. If a path or route fails, it may be desirable to reroute the call over another path or route. However, there is currently no known mechanism for performing this action since existing IP routing protocols, such as OSPF, propagate route changes too slowly for calls in progress to be rerouted.

Accordingly, there exists a need for improved methods and systems for detecting a voice-over-IP route failure and for dynamically rerouting calls in response to a route failure.

SUMMARY

In one aspect of the subject matter disclosed herein, a method is disclosed for methods for re-routing VoIP sessions in a VoIP device in response to failure of an IP route. First, a plurality of IP paths or routes are established between a first VoIP device and a second VoIP device. VoIP sessions are assigned to the IP routes. A request-reply protocol is used to detect a failure on at least one of the IP routes. In response to detecting a failure on at least one of the IP routes, VoIP sessions are rerouted from at least one failed IP route to at least one alternate IP route.

The terms path and route are used interchangeably herein. As used herein, a path or route is a series of routers through which a remote VoIP device is reachable. At each interface of the local VoIP device, each route may be represented by a routing table entry that includes the next-hop router for each route. These routes may be programmed into a VoIP device at initialization time and may be used by incoming and outgoing VoIP session packets. In one implementation, the routes used by the VoIP device for session establishment is a set of static routes to the next-hop routers through which the remote VoIP device is reachable. The routes are static in the sense that they are programmed at initialization time and are reconfigurable by an operator. According to the subject matter described herein, a request-reply protocol, such as ARP, is used to maintain route status. If the status of one or more routes changes, sessions may be re-directed based on the change.

In another aspect of the subject matter disclosed herein, a method for detecting a failure of an IP route in a VoIP device includes sending a request-reply protocol request over an IP route to a router associated with the IP route, determining whether a reply to the request-reply protocol request is received within a predetermined time period. In response to determining that a reply to the request-reply protocol request is not received within the time period, a failure is indicated.

In another aspect of the subject matter disclosed herein, a system is disclosed for re-routing VoIP sessions in a VoIP device in response to a failure of an IP route. The system includes a resource manager for assigning VoIP sessions to one of a plurality of the IP routes. At least one reachability status monitoring module is included for sending request-reply protocol requests to next hop routers associated with each of the routes and receiving replies from reachable routers. The resource manager is adapted to detect failure of any of the IP routes based on the absence of the replies and, in response to detecting failure of any of the IP routes, the resource manager is adapted to reroute sessions from the failed IP route to an available IP route.

In another aspect of the subject matter disclosed herein, an IP device for detecting a failure of an IP route includes logic configured to send a request-reply protocol request over an IP route to a router associated with the IP route, logic configured to determine whether a reply to the request-reply protocol request is received within a predetermined time period, and logic configured to, in response to determining that a reply to the request-reply protocol request is not received within the time period, detect a failure on the IP route.

BRIEF DESCRIPTION OF THE DRAWINGS

Objects and advantages of the subject matter described herein will become apparent to those skilled in the art upon reading this description in conjunction with the accompanying drawings, in which like reference numerals have been used to designate like elements, and in which.

DETAILED DESCRIPTION

To facilitate an understanding of exemplary embodiments, many aspects are described in terms of sequences of actions that can be performed by elements of a computer system. For example, it will be recognized that in each of the embodiments, the various actions can be performed by specialized circuits or circuitry (e.g., discrete logic gates interconnected to perform a specialized function), by program instructions being executed by one or more processors, or by a combination of both.

Moreover, the sequences of actions can be embodied in any computer-readable medium for use by or in connection with an instruction execution system, apparatus, or device, such as a computer-based system, processor containing system, or other system that can fetch the instructions from a computer-readable medium and execute the instructions.

As used herein, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non exhaustive list) of the computer-readable medium can include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CDROM).

Thus, the subject matter disclosed can be embodied in many different forms, and all such forms are contemplated to be within the scope of what is claimed. Any such form of embodiment can be referred to herein as "logic configured to" perform a described action, or alternatively as "logic that" performs a described action.

Figure 1:
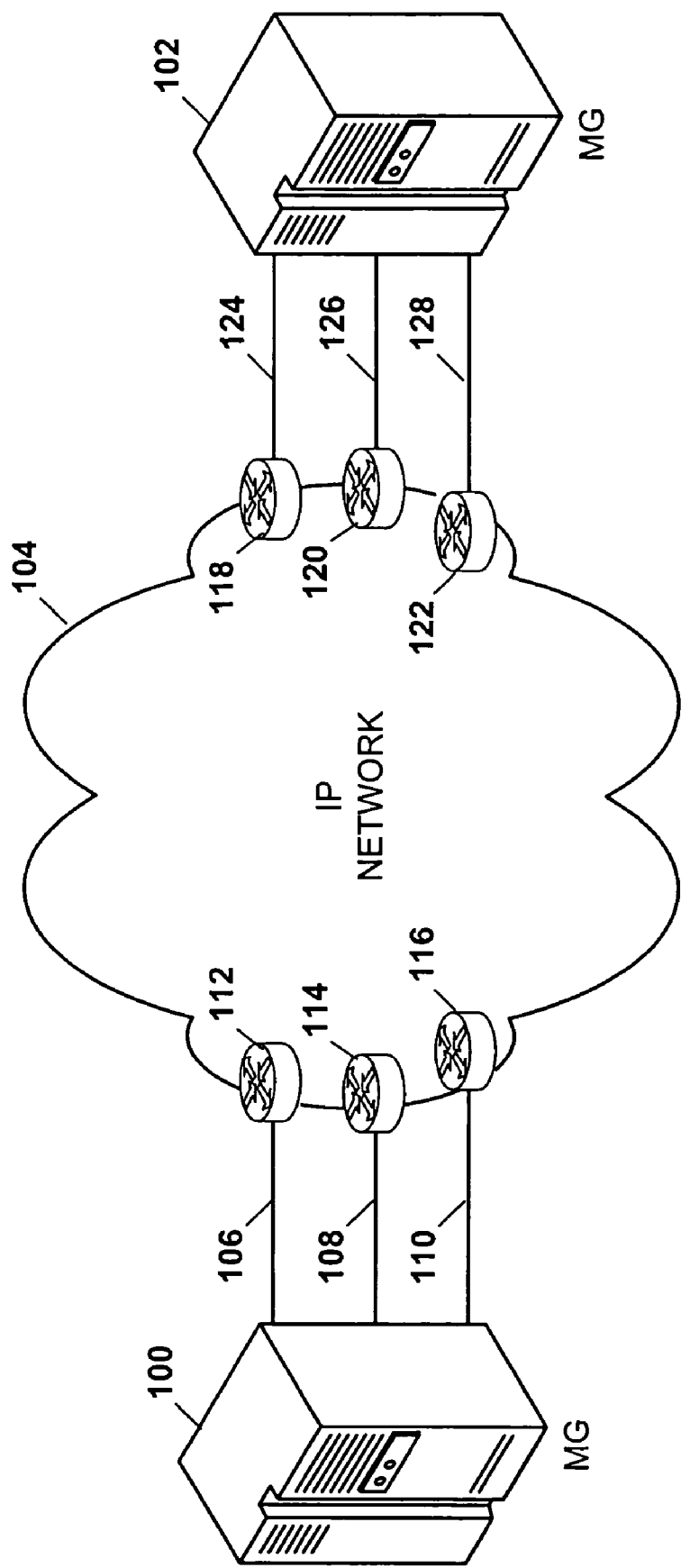
FIG. 1 is a schematic diagram illustrating media gateways interconnected through an IP network.
Figure 2:
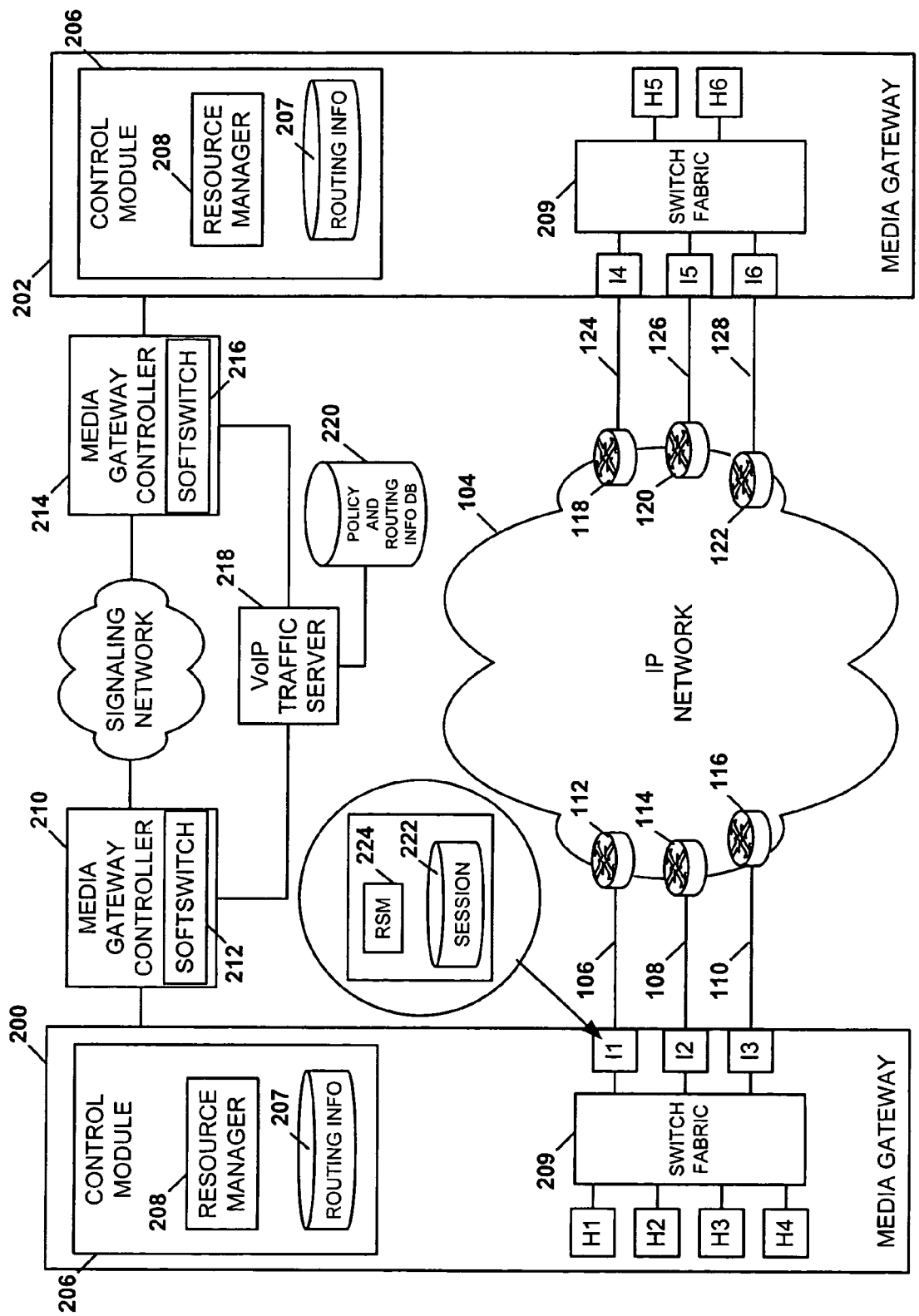
FIG. 2 is a schematic diagram illustrating exemplary media gateways according to an aspect of the subject matter disclosed herein.

Methods and systems are disclosed herein for detecting IP route failure and for re-routing VoIP sessions in a VoIP device in response to failure of an IP route. Although a media gateway is described herein by way of example, it should be understood that the methods and systems disclosed herein may be applied to any VoIP device, such as a VoIP terminal or phone and the like, or to any IP routing device. FIG. 2 is a schematic diagram illustrating exemplary media gateways 200 and 202 according to an aspect of the subject matter disclosed herein. Referring to FIG. 2, media gateways 200 and 202 are connected to one another via multiple IP routes through IP network 104. IP network 104 includes next-hop routers 112, 114, 116, 118, 120, and 122 connected with one another and with media gateways 200 and 202 through route segments 106, 108, 110, 124, 126, and 128. Next-hop routers 112, 114, and 116 are connected to each of next-hop routers 118, 120, and 122 via multiple IP routes through network 104.

In the illustrated example, media gateway 200 includes VoIP hosts H1-H4, a plurality of network interfaces I1-I3, a control module 206, routing tables 207, a resource manager 208, and a switch fabric 209. Media gateway 202 likewise may include interfaces I4-I6, VoIP hosts H5 and H6, a control module 206, routing tables 207, a resource manager 208, and a switch fabric 209. In FIG. 2, the components of media gateway 202 are assumed to be similar in function to the corresponding components of media gateway 200, although this is not required. Hence, for simplicity of illustration, a description of the components and operation of media gateway 202 will not be provided herein. Media gateway 200 is connected to next-hop routers 112, 114, and 116 via interfaces I1, I2, and I3, and route segments 106, 108, and 110, respectively. Similarly, media gateway 202 is connected to next-hop routers 118, 120, and 122 via interfaces I4, I5, and I6, and route segments 124, 126, and 128, respectively.

Although in the example illustrated in FIG. 2 each interface I1-I6 is connected to a single next-hop router, the subject matter described herein is not limited to such an implementation. In an alternate implementation, each interface may be connected to multiple next-hop routers via multiple route segments for increased reliability. In such an implementation, if one next-hop router fails, calls may be rerouted over an alternate next-hop router without changing interfaces in the media gateway. Each VoIP host H1-H4 contains voice processing resources for processing VoIP and TDM voice streams. For example, each VoIP host may include codecs, VoIP, ATM, and TDM chips, and digital signal processing resources for processing VoIP streams. A detailed description of exemplary resources that may be found in VoIP hosts H1-H4 are described in commonly assigned, co-pending U.S. patent application Ser. No. 10/676,233, filed Oct. 1, 2003, the disclosure of which is incorporated herein by reference in its entirety.

VoIP hosts H1-H4 are each assigned individual IP addresses and are each reachable through switch fabric 209, via any of IP interfaces I1, I2, and I3, and respective next-hop routers 112, 114, and 116. Because of the multi-interface visibility, VoIP hosts H1-H4 can communicate with nodes reachable through IP network 104 using each of route segments 106, 108, and 110. Next-hop routers 112, 114, and 116 may collect link status information from IP network 104 and maintain routing tables, which are used in maintaining multiple routes from each next-hop router 112, 114, 116 to other nodes in IP network 104. In short, a plurality of IP routes are established between media gateway 200 and media gateway 202 over which media sessions are routed. Control module 206 may include a route table 207 that is configured with entries containing the next-hop router for each IP route. In the example shown in FIG. 2, three IP routes are established from media gateway 200 from hosts H1-H4 via switch fabric 209, interfaces I1-I3, route segments 106, 108, and 110, next hop routers 112, 114, and 116, respectively, and on through IP network 104.

A media gateway may have a maximum of j routes to a remote VoIP address, where j is determined by the number of local VoIP addresses and the number of next-hop routers. Media gateway 200 assigns a new VoIP session to a route over which packets associated with the VoIP session are forwarded by searching a routing table 207 for the IP address of the remote device, e.g., media gateway 202, that is received during the session establishment procedure. The routing table 207 contains route entries that can be used to reach the remote device. If there are multiple route entries that can be used to reach the remote device, then one route entry is selected based on a suitable selection algorithm, such as round-robin, load balancing, and the like. Since each route entry contains the IP address of a next-hop router connected to the media gateway 200, selection of a route entry indirectly selects which interface will be used, and consequently which route to the interface will be utilized.

In FIG. 2, each interface I1-I3 in media gateway 200 is connected to a single next-hop router, although this is not required. As a result, the route or route for the session is selected based on which next-hop router the route entry selected from the routing table 207 indicates. As will be described in detail below, the reachability of next-hop routers 112, 114, and 116 may be confirmed at various times, e.g., at sub-second time intervals, in order to determine when a next-hop router is not reachable and allow for call rerouting over a different route segment to a different next-hop router that is reachable.

Control manager 206 of media gateway 200 controls the overall operation of media gateway 200 and communicates with media gateway controller 210 to set up and tear down calls. Resource manager 208 of control module 206 controls allocation of VoIP sessions and indirectly assigns sessions to IP routes as described above. Resource manager 208 assigns one of the hosts H1-H4 dynamically as a shared resource. Resource manager 208 may then populate VoIP session tables 222 that are maintained by each interface I1-I3. Each interface I1-I3 may include a network processor and associated memory. The session table 222 may be stored in the memory. The session table 222 contains a session identifier and a corresponding VoIP host identifier. A VoIP session may be identified by a local VoIP host IP address and a local UDP port and optionally a remote VoIP host IP address and UDP port. When a packet arrives at one of interfaces I1-I3, a lookup is performed in the session table 222. If the packet is assigned to an existing session, the packet will be forwarded to the VoIP host associated with the session. For sessions initiated by media gateway 200, resource manager 208 may assign a VoIP host, an interface, and an IP route based on any suitable criteria, such as load sharing criteria.

Media gateway controller 210 may include an internal softswitch 212 for controlling the operations of media gateway 200. Similarly, media gateway controller 214 may include an internal softswitch 216 for setting up and tearing down sessions in media gateway 202. As discussed above, communications between media gateways and their associated media gateway controllers may occur via a standard media gateway control protocol, such as MGCP or MEGACO. A VoIP traffic server 218 may perform traffic engineering functions based on policy and routing information stored in policy and routing information database to 220.

Conventional methods of determining that a route has failed have been limited. One way is to detect the absence of packets at the remote end of a session for a predetermined time period. For example, media gateway 200 may send packets via route segment 106 to next-hop router 112 through IP network 104 to next-hop router 122 and on to media gateway 202 over route segment 128. If, for example, route segment 106 or next-hop router 112 is not functional, media gateway 202 could, for example, sense the absence of anticipated packets and report their absence back to media gateway 200. This would require a relatively long waiting period. In the meantime, time and resources are wasted sending packets that will never arrive at their destination.

Alternatively, other conventional methods may rely on routing protocol information being propagated by IP network 104. Routing protocols, such as RIP and OSPF, propagate link status information to IP routers. When a link fails, the router detecting the failure will inform other routers by forwarding link status information on its output ports. Each router receiving the link status information will do likewise. Each router will update its forwarding table based on the status of the failed link. Eventually, the forwarding tables of all routers in the network will be updated.

One problem with conventional routing protocols is that there is no standard mechanism used to detect failure and quickly communicate failure information to other nodes in the network. For example, some media do not provide physical indications of a carrier loss. Routing protocols, such as distance vector protocols, broadcast their route tables every 10-90 seconds, regardless whether the route status has changed. Once new routing information is received, each router must recalculate the route tables if route statuses have changed. The time between route table updates and the time required to recalculate route tables based on updates is unsuitable for rerouting voice-over-IP sessions because of the real time nature of such sessions.

According to an aspect of the subject matter disclosed herein, IP routes are checked using a request-reply protocol to quickly detect a failure on an IP route, such as a next-hop router failure or other problems over the route, without having to wait for a response from the remote end to which the packets are ultimately destined or error messages to be generated by the network. For example, address resolution protocol (ARP) requests may be used to detect a failure of an IP route. ARP is an address resolution protocol used to obtain a node's physical address. Although ARP is described herein by way of example, it should be understood that the methods and system described herein can employ network status probing using any communications protocol that includes request and reply signaling parameters. That is, any communications protocol that includes a request signal and/or message sent to a remote IP device that triggers a response back from the remote IP device may be employed, and all such protocols are referred to herein as a request-reply protocol.

ARP is one such protocol. ARP is described in IETF RFC 826, November, 1982, the disclosure of which is incorporated herein by reference in its entirety. According to ARP, a node, such as media gateway 200, broadcasts an ARP request onto the network with the IP address of the target node it wishes to communicate with, e.g., next-hop router 112, and the node with that address responds by sending back its physical address. That is, a reply to an ARP request returns a node's layer 2 address that corresponds to the node's layer 3 address. Once a node receives the physical address that it seeks, the node stores the physical address and the corresponding IP address in an ARP cache. When a new packet is to be transmitted to the IP address, a lookup is performed in the ARP cache. If an entry is present in the ARP cache, an ARP request will not be broadcast, and the packet will be sent to the physical address in the ARP cache entry. Entries in the ARP cache may time out after predetermined time intervals, requiring new requests.

ARP requests have conventionally been limited in use to address resolution functions. In contrast, as described herein, ARP requests may be advantageously used to detect the failure of some or all of the IP routes to allow for dynamic rerouting of calls more quickly than previously obtainable using the conventional methods mentioned above. The ARP requests are generated by reachability status monitoring (RSM) modules 224 that are included, for example, in network interfaces I1-I3. As described above, route table 207 may contain IP route information to remote media gateway 202. For example, the route table 207 may indicate that media gateway 202 is reachable via next-hop router 112 via interface I1. Similarly, the route table 207 may indicate that media gateway 202 is reachable via network next-hop router 114 via interface I2. The route table 207 may indicate that media gateway 202 is reachable via next-hop router 116 and interface I3.

RSM modules 224 preferably periodically send requests using a request-reply protocol to next-hop routers 112, 114, and 116, which prompt next-hop routers 112, 114, and 116 to reply. For example, RSM modules 224 may send ARP requests to next-hop routers 112, 114, and 116. The ARP requests are preferably generated independently of the need for address resolution or the presence of entries in the ARP cache maintained by each interface. If the RSM module fails to receive a reply to an ARP request within a predetermined time period, RSM module 224 may inform resource manager 208. Resource manager 208 may update the corresponding entry in route table 207 to indicate that the next hop router to which the ARP request was sent is unreachable. In addition, resource manager 208 may dynamically reallocate calls that were previously allocated to the failed route over the existing routes.

In one example, RSM module 224 in network interface I1 broadcasts ARP requests over route segment 106, which are received by next-hop router 112. If next-hop router 112 is operational and there are no problems on route segment 106, next-hop router 112 receives the ARP request and responds. The response is received at network interface I1 and processed by resource manager 208. Accordingly, next-hop router 112 is deemed to be reachable and VoIP sessions over the associated VoIP route are continued. If, however, no response to the ARP request is received, then resource manager 208 may determine that next-hop router 112 is unreachable and detect a failure on the associated IP route. The failure could be, for example, due to a problem with next-hop router 112 or a problem on route segment 106. Once resource manager 208 detects a failure on the associated IP route, resource manager 208 re-routes sessions on the failed IP route to another available IP route, such as through next-hop routers 114 and/or 116 via route segments 108 and/or 110, respectively.

The request-reply protocol requests for maintaining IP route status information may be sent at suitable intervals selected by the network operator. In one implementation, an interval may be selected to ensure that existing voice-over-IP sessions can be dynamically rerouted without noticeable delay to the session users. For example, if the sessions are voice calls, it is desirable that the participants in the call do not experience delay in sending or receiving communications. Accordingly, ARP requests may be sent at intervals that are designed to meet quality of service requirements for voice calls. In order to meet the quality of service requirements for voice calls, ARP requests may be sent at sub-second intervals, such as intervals on the order of milliseconds, tens of milliseconds, or one hundreds of milliseconds. Any suitable broadcast interval for maintaining a desired quality of service for existing media sessions is intended to be within the scope of subject matter described herein.

Figure 3:
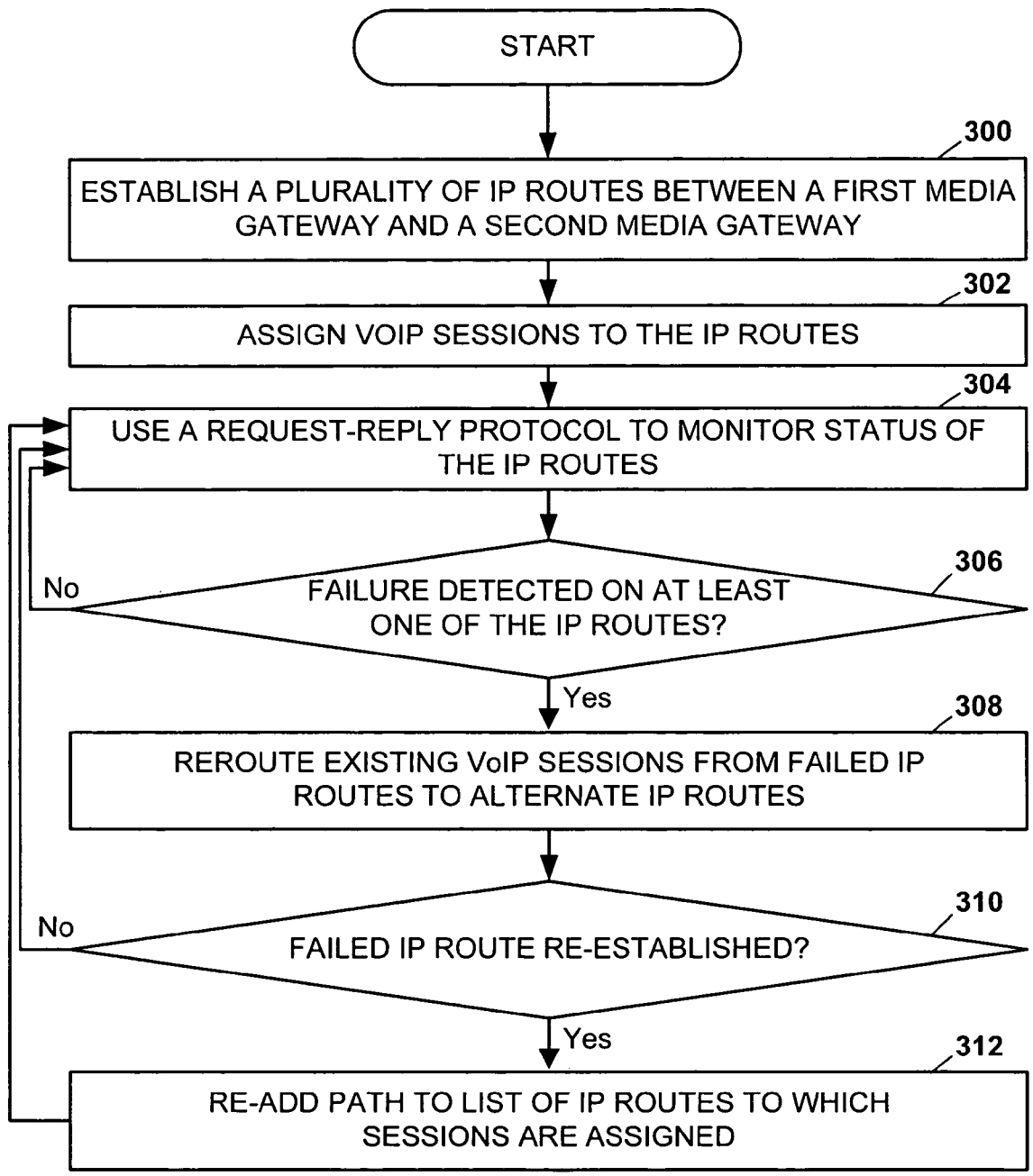
FIG. 3 is a flow chart illustrating a method for re-routing VoIP sessions in a media gateway in response to failure of an IP route according to an aspect of the subject matter disclosed herein.

FIG. 3 is a flow chart illustrating a method for monitoring IP route status and for re-routing VoIP sessions in a media gateway in response to failure of an IP route according to an aspect of the subject matter disclosed herein. Referring to FIG. 3, in step 300, a plurality of IP routes are established between a first media gateway and a second media gateway. VoIP sessions are assigned to the IP routes in step 302. In step 304, a request-reply protocol is used to monitor the status of the IP routes. In response to detecting a failure of the IP route in step 306, the VoIP sessions are rerouted from the IP route to at least one alternate IP route. In response to failing to detect a failure on at least one of the IP routes in step 306, control returns to step 304 where the statuses of the routes are continuously maintained.

Once a failure has been detected, the request-reply protocol preferably continues to be used to monitor the status of the failed route. Accordingly, after the call rerouting in step 308, control proceeds to step 310 where it is determined whether the failed route has been re-established. If the failed route has not been re-established, control returns to step 304 where the status of each of the IP routes is continuously monitored. In step 310, if it is determined that the failed route has been re-established, control proceeds to step 312 where the route is re-added to the list of IP routes to which new sessions are assigned.

Figure 4:
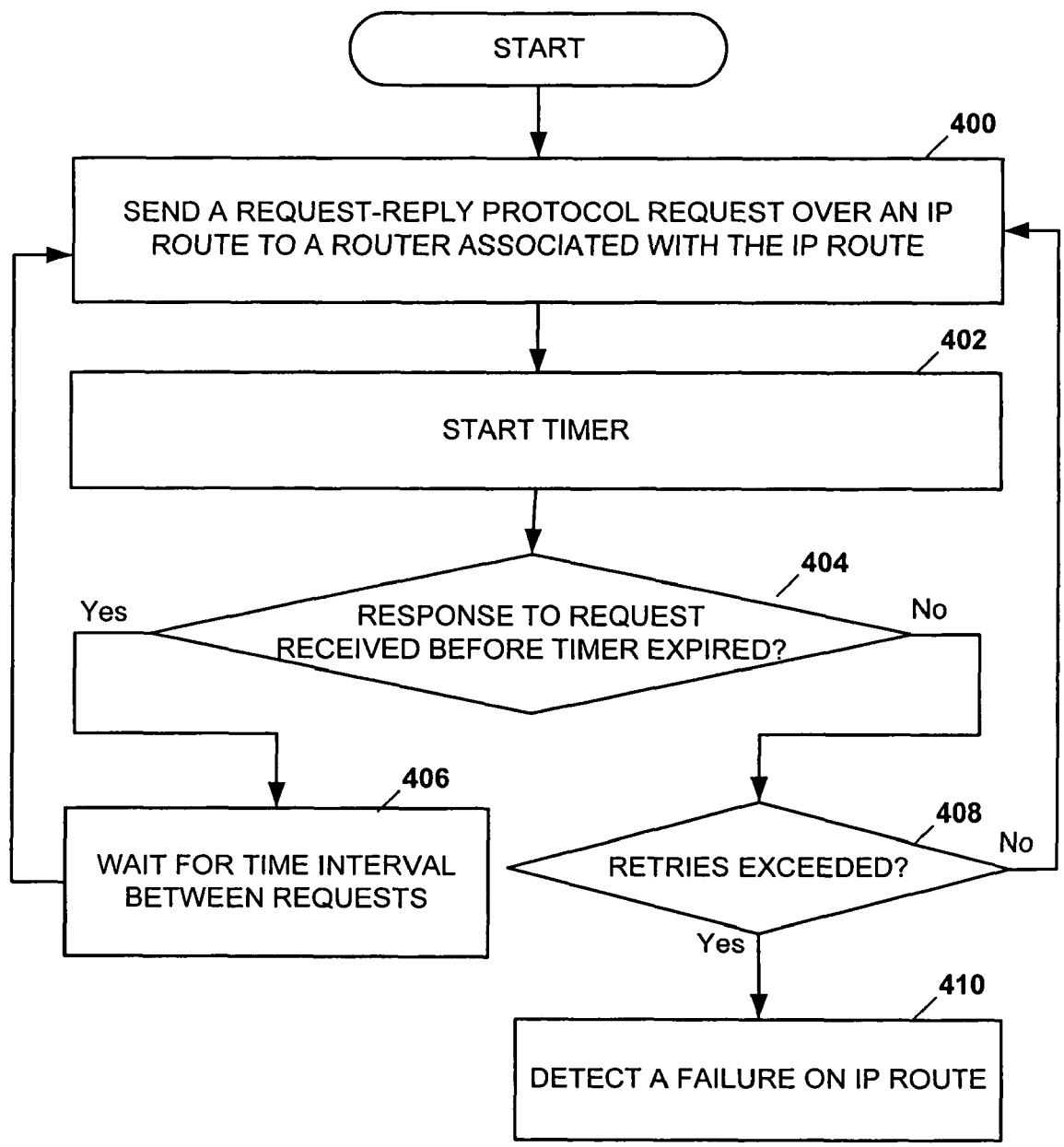
FIG. 4 is a flow chart illustrating a method for detecting a failure of an IP route in a media gateway according to an aspect of the subject matter disclosed herein.

FIG. 4 is a flow chart illustrating a method for detecting a failure of an IP route in a media gateway according to an aspect of the subject matter disclosed herein. In step 400, a request-reply protocol request is sent over an IP route to a router associated with the IP route. In step 402, a timer is started. In step 404, it is determined whether a response to the request has been received before the timer expires. In response to determining that a response to the request has been received before the timer expires in step 404, a predetermined time interval between requests is waited in step 406 and control returns to step 400 to send the next request. In response to determining that a response to the request has not been received before the timer expires in step 404, a check is made to determine if the number of request retries is exceeded in step 408. If the number of retries is exceeded in step 408, a failure on the IP route is indicated in step 410. If, however, the number of retries has not been exceeded, control returns to step 400 to retry another request. Here, requests are retried to ensure the route is down before rerouting traffic. The number of retries may be set to zero or any positive integer and may be predetermined by a network operator.

Once again, it should be understood that although communications between media gateways are described herein by way of example, the methods and systems disclosed herein may be employed with any VoIP device. Moreover, the use of request-reply protocol messages to indicate a route failure corresponding to routing table entries can be extended to any device employing IP routing, such as an IP router.

It will be understood that various details of the invention may be changed without departing from the scope of the claimed subject matter. Furthermore, the foregoing description is for the purpose of illustration only, and not for the purpose of limitation, as the scope of protection sought is defined by the claims as set forth hereinafter together with any equivalents thereof entitled to.

What is claimed is:

1. A method for re-routing voice-over-IP (VoIP) sessions in a VoIP device in response to failure of an IP route, the method comprising:

(a) establishing a plurality of IP routes between a first VoIP device and a second VoIP device;

(b) assigning VoIP sessions to the IP routes;

(c) using a request-reply protocol to substantially periodically monitor status of at least one of the IP routes, wherein using a request-reply protocol to monitor status includes sending layer 2 address resolution protocol (ARP) requests to a next-hop router to test the next-hop router and a link to the next-hop router; and (d) in response to detecting a failure of at least one of the IP routes based on the testing, re-routing VoIP sessions from the at least one failed IP route to at least one alternate IP route.

2. The method of claim 1 wherein the first and second VoIP devices each comprise a VoIP terminal.

3. The method of claim 1 wherein the first and second VoIP devices each comprise a media gateway.

4. The method of claim 1 wherein establishing a plurality of VoIP routes includes establishing a plurality of VoIP paths.

5. The method of claim 1 wherein establishing a plurality of IP routes includes provisioning routes to next-hop routers through which the second VoIP device is reachable in a routing table associated with the first VoIP device.

6. The method of claim 5 wherein using a request-reply protocol to monitor status of at least one of the IP routes includes sending a request to a next-hop router associated with at least one of the IP routes.

7. The method of claim 6 comprising, in response to failing to receive a reply to the request within a predetermined time period, updating a status of a route associated with the next-hop router to indicate that the second VoIP device is not reachable via the route.

8. The method of claim 1 wherein using a request-reply protocol to monitor status of at least one of the IP routes includes sending the ARP requests to the next-hop router at intervals structured to maintain a predetermined VoIP session quality.

9. The method of claim 8 wherein sending the ARP requests at intervals structured to maintain a predetermined VoIP session quality includes sending the ARP requests at intervals that are independent of the need to determine a physical address corresponding to a network address of the next-hop router.

10. The method of claim 1 comprising, after detecting failure of the at least one IP route, using the request-reply protocol to monitor status of the failed IP route.

11. The method of claim 10 comprising, in response to detecting reestablishment of the failed IP route, adding the route to a list of routes to which new sessions are assigned.

12. The method of claim 1 wherein using a request-reply protocol to detect a failure of at least one IP route comprises:
(a) substantially periodically sending the ARP requests the next-hop router;
(b) determining whether a reply to each ARP request is received within a predetermined time period; and
(c) in response to determining that a reply to one of the ARP requests is not received within the predetermined time period, indicating failure of the IP route.

13. A method for detecting failure of an IP route between first and second voice over IP (VoIP) devices, the method comprising:
(a) substantially periodically sending request-reply protocol requests to a router associated with an IP route between first and second voice over IP (VoIP) devices, wherein sending request-reply protocol requests to a router includes sending layer 2 address resolution protocol (ARP) requests to a next-hop router to test the next-hop router and a link to the next-hop router;
(b) determining whether a reply to each ARP request is received within a predetermined time period; and
(c) in response to determining that a reply to one of the ARP requests is not received within the predetermined time period, indicating failure of the IP route.

14. The method of claim 13 wherein sending a the ARP requests includes sending an address resolution protocol request at an interval that is independent of a need for physical address resolution.

15. The method of claim 13 wherein the second VoIP device is reachable through the next-hop router.

16. The method of claim 13 comprising, in response to receiving a reply to the request-reply protocol request, repeating steps (a)-(c) at predetermined time intervals and maintaining status information associated with the IP route.

17. The method of claim 16 wherein repeating steps (a)-(c) at predetermined time intervals includes repeating steps (a)-(c) at time intervals designed to ensure quality of service for VoIP sessions.

18. The method of claim 13 comprising, after indicating failure of the IP route, repeating steps (a)-(c) at predetermined time intervals to detect reestablishment of the IP route.

19. The method of claim 18 comprising, in response to detecting reestablishment of the IP route, adding the IP route to a list of IP routes to which voice-over-IP sessions are assigned.

20. The method of claim 13 wherein the first and second VoIP devices comprise media gateways.

21. The method of claim 13 wherein the first and second VoIP devices comprise VoIP terminals.

22. A system for detecting failure of VoIP sessions and for dynamically re-routing sessions in a VoIP device in response to a failure of an IP route, the system comprising:
(a) a resource manager for assigning VoIP sessions to the IP routes between a local VoIP device and a remote VoIP device; and
(b) at least one reachability status monitoring module for substantially periodically sending request-reply protocol requests to next hop routers associated with each of the routes and for receiving replies from reachable routers, wherein, in response to failing to receive a reply from a next-hop router within a predetermined time period, the reachability status monitoring modules are adapted to indicate an IP route failure to the resource manager and in response to the IP route failure, the resource manager is adapted to dynamically reallocate VoIP sessions among available IP routes and wherein sending request-reply protocol requests includes sending layer 2 address resolution protocol (ARP) requests to the next-hop routers to test the next-hop routers and links to the next-hop routers.

23. The system of claim 22 wherein the first and second VoIP devices each comprise a media gateway.

24. The system of claim 22 wherein the first and second VoIP devices each comprise a VoIP terminal.

25. The system of claim 22 wherein the IP routes comprise VoIP paths.

26. The system of claim 22 wherein, in response to detecting failure of an IP route, the reachability status monitoring module is adapted to continue to send request-reply protocol requests to a next-hop router associated with the failed IP route.

27. The system of claim 26 wherein, in response to receiving a reply from the next-hop router associated with the failed IP route, the reachability status monitoring module is adapted to inform the resource manager and the resource manager is adapted to add the IP route to a list of IP routes to which sessions are assigned.

28. The system of claim 22 wherein, in response to detecting an IP route failure, the reachability status monitoring module is adapted to update an IP route table to indicate failure of the IP route.

29. The system of claim 22 wherein the reachability status monitoring module is adapted to send ARP requests to each next-hop router at an interval that is independent of a need for physical address resolution.

30. A system for detecting a failure of an IP route comprising:
(a) logic configured to substantially periodically send request-reply protocol requests over an IP route to a router associated with the IP route between first and second VoIP devices, wherein the request-reply protocol requests include layer 2 address resolution protocol (ARP) requests sent to a next-hop router to test the next-hop router and a link to the next-hop router;
(b) logic configured to determine whether a response to each ARP protocol request has been received within a predetermined time period; and
(c) logic configured to, in response to determining that a response to one of the ARP protocol requests has not been received within the predetermined time period, detect a failure of the IP route.

31. The system of claim 30 wherein the logic configured to send the ARP requests at an interval that is independent of a need for physical address resolution.

32. The system of claim 30 wherein elements (a)-(c) are components of a media gateway.

33. The system of claim 30 wherein elements (a)-(c) are components of a VoIP terminal.

34. The system of claim 30 wherein elements (a)-(c) are components of an IP router.

* * * * *

UNITED STATES PATENT AND TRADEMARK OFFICE
CERTIFICATE OF CORRECTION

PATENT NO. : 7,864,665 B2
APPLICATION NO. : 11/015296
DATED : January 4, 2011
INVENTOR(S) : Shei et al.

Page 1 of 1

It is certified that error appears in the above-identified patent and that said Letters Patent is hereby corrected as shown below:

On the Title page, item (73) Assignee
Replace "Tekelec, Morrisville, NC (US)"
with --GENBAND US LLC, Plano, Texas (US)--

Signed and Sealed this
Fifth Day of July, 2011

David J. Kappos
*Director of the United States Patent and Trademark Office*